United States Patent
Sawada

(10) Patent No.: US 7,812,417 B2
(45) Date of Patent: Oct. 12, 2010

(54) ELECTRET CAPACITOR TYPE COMPOSITE SENSOR

(75) Inventor: Tatsuhiro Sawada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 299 days.

(21) Appl. No.: 12/159,717

(22) PCT Filed: Feb. 28, 2007

(86) PCT No.: PCT/JP2007/053819

§ 371 (c)(1),
(2), (4) Date: Jun. 30, 2008

(87) PCT Pub. No.: WO2007/100015

PCT Pub. Date: Sep. 7, 2007

(65) Prior Publication Data

US 2009/0267168 A1    Oct. 29, 2009

(30) Foreign Application Priority Data

Feb. 28, 2006    (JP)    ............................. 2006-053129

(51) Int. Cl.
*H01L 27/14* (2006.01)
(52) U.S. Cl. ................. 257/414; 257/E25.032
(58) Field of Classification Search ................. 257/414, 257/416, 434, E25.032
See application file for complete search history.

(56) References Cited

U.S. PATENT DOCUMENTS

| | | | |
|---|---|---|---|
| 4,972,099 A | 11/1990 | Amano et al. | |
| 5,753,983 A | 5/1998 | Dickie et al. | |
| 2004/0113058 A1 | 6/2004 | Sonoki | |
| 2009/0267168 A1 * | 10/2009 | Sawada | ...................... 257/432 |

FOREIGN PATENT DOCUMENTS

| | | |
|---|---|---|
| JP | 1-196518 | 8/1989 |
| JP | 4-291606 | 10/1992 |
| JP | 2000-075046 | 3/2000 |
| JP | 2001-083004 | 3/2001 |
| JP | 2004-191087 | 7/2004 |
| JP | 2004-354199 | 12/2004 |
| JP | 2005-191208 | 7/2005 |

OTHER PUBLICATIONS

Extended European Search Report issued in European Patent Application No. EP 07 73 7538, dated Apr. 21, 2010.

* cited by examiner

*Primary Examiner*—Mark Prenty
(74) *Attorney, Agent, or Firm*—McDermott Will & Emery LLP

(57) ABSTRACT

To provide a small, thin and light-weighted composite sensor which can also detect light together with sound, vibration, pressure or acceleration by a single sensor.

An electret capacitor type composite sensor is constituted by a casing 11, an electrode 12, a hole portion (which is a sound hole and also a light introduction hole) 22, a spacer 31, a vibration plate 41 having light transmissibility, a vibration plate ring 42, a printed board 6 and a semiconductor element 61. Further, a photoelectric conversion portion having a function of photoelectric effect is provided at a portion of the surface of the semiconductor element 61, light is conducted to the photoelectric conversion portion via the hole portion 22 and the vibration plate 41 having light transmissibility, and an electric signal generated by the photoelectromotive force is taken out independently from an electric signal generated by the change of the electrostatic capacitance of the electret capacitor.

11 Claims, 6 Drawing Sheets

SOUND DETECTION GRAPH ※VOLTAGE Vds

LIGHT DETECTION GRAPH ※CURRENT Ids

ACOUSTIC FREQUENCY CHARACTERISTICS

ILLUMINATION-CURRENT GRAPH
(IRRADIATE LIGHT TO HOLE PORTION)

US 7,812,417 B2

ELECTRET CAPACITOR TYPE COMPOSITE SENSOR

RELATED APPLICATIONS

This application is the U.S. National Phase under 35 U.S.C. §371 of International Application No. PCT/JP2007/053819, filed on Feb. 28, 2007, which in turn claims the benefit of Japanese Application No. 2006-053129, filed on Feb. 28, 2006, the disclosures of which Applications are incorporated by reference herein.

TECHNICAL FIELD

The present invention relates to an electret capacitor type composite sensor (including a microphone) that can by itself detect a physical amount of sound, vibration, pressure or acceleration etc. and (a physical amount of light.

BACKGROUND ART

A multivariate detection sensor that can detect a physical amount of sound, vibration, pressure or acceleration etc. and a physical amount of light is described in a patent document 1, for example.

The multivariate detection sensor described in the patent document 1 utilizes the combination of an electret capacitor and an optical sensor.

That is, as to a physical amount of sound, vibration, pressure or acceleration etc., the change of an electrostatic capacitance is converted into a voltage etc. and the physical amount of each of these parameters is detected based on the converted value. Further, a physical amount of light is detected by using another sensor different from an electret capacitor type sensor.

Patent Document 1: JP-A-2004-354199 (page 1, FIG. 1).

DISCLOSURE OF THE INVENTION

In the related art, there is a case where the following two inconveniences occur.

(1) According to the electret capacitor type sensor having the structure of the related art itself, although sound, vibration or pressure can be detected, light can not be detected simultaneously.

(2) Thus, in order to also detect light, it is required to combine with another sensor. For example, a sensor is provided which converts light into a heat amount and further converts the heat amount into pressure. The electret capacitor type sensor can detect and output the pressure value. However, in this case, since the conversion efficiency in the case of converting light into heat is quite bad, it is difficult to detect a small amount of light. Further, the structure tends to complicate and enlarge.

The invention is made in view of the aforesaid circumstance and an object of the invention is to provide a small, thin and light-weighted composite sensor that can also detect light together with sound, vibration, pressure or acceleration by a single sensor.

MEANS FOR SOLVING THE PROBLEMS

An electret capacitor type composite sensor according to the invention is the electret capacitor type composite sensor which contains an electret capacitor and a semiconductor element having a function of amplifying and outputting a signal obtained from the electret capacitor, can detect a predetermined physical amount according to a change of an electrostatic capacitance of the electret capacitor and has a light detection function, wherein the semiconductor element has a photoelectric conversion portion, an electric signal is generated by photoelectric conversion when light is conducted to the photoelectric conversion portion, and the electric signal is outputted from the semiconductor element discriminatively from an electric signal generated due to a change of the electrostatic capacitance of the electret capacitor.

In an electret capacitor type sensor, it is usual that the change of the electrostatic capacitance of the electret capacitor is converted into an electric signal (voltage or current), and the semiconductor element at the output stage of an FET (field effect transistor) etc. amplifies the electric signal and outputs the amplified signal. According to the invention, the semiconductor element is notified, and a photo-reactive surface (a functional semiconductor surface such as a PN junction or a PIN junction generating photoelectromotive force by the photoelectric conversion) is provided at a part of the semiconductor element, thereby making it possible to detect light simultaneously. Further, when the electrostatic capacitance of the electret capacitor is set to a sufficiently small value, the level of the voltage change of the electret capacitor can be made sufficiently small. On the other hand, when the voltage level of the photoelectromotive force generated by the light irradiation is set to a sufficiently large value, it is possible to discriminate between the level of the voltage change of the electret capacitor and the voltage level of the photoelectromotive force. That is, these signals can be detected as independent parameters without performing any particular discriminating procedure. Further, since a part of the semiconductor element is also used as a sensor for detecting light, the number of parts does not increase and the complication and enlargement of the entire configuration of the sensor can be prevented.

Further, according to the invention, in the electret capacitor type composite sensor, at least a part of a sound hole for conducting sound to a vibration plate constituting the electret capacitor overlaps with the photoelectric conversion portion of the semiconductor element.

Further, according to the invention, in the electret capacitor type composite sensor, the vibration plate is formed by material having light transmissibility, and light is conducted to the photoelectric conversion portion of the semiconductor element via the sound hole and the vibration plate.

The sound hole, which is the necessary element for the electret capacitor type sensor, is also used as a light induction hole and the vibration plate (vibration film) is constituted by the light transmissibility material, whereby light is conducted to the photoelectric conversion portion of the semiconductor element without difficulty via the sound hole and the vibration plate. Thus, the capacitor type sensor itself can detect a physical amount of sound, vibration, pressure or acceleration as well as light, and further can maintain the small-sized and thin state without increasing the number of parts of the capacitor type sensor of the related art.

Further, according to the invention, in the electret capacitor type composite sensor, the semiconductor element is mounted on a mounting board, at least a part of the mounting board is formed by material having light transmissibility, and the photoelectric conversion portion of the semiconductor element is disposed so as to receive light being incident from a portion formed by the material having light transmissibility of the mounting board.

At least a part of the mounting board is constituted by the light transmissibility material so as to entering light from the mounting board side. According to this configuration, the permeability of light is adjusted by selecting the material of the mounting board so that light from the mounting board side is passed through the board and can be detected. In this case, the detection sensitivity can be adjusted. Further, the permeability of light can also be changed according to the layout of the mounting board. and so the detection sensitivity can be adjusted. As a result, the capacitor type sensor itself can detect a physical amount of sound, vibration, pressure or acceleration as well as light, and further can maintain the small-sized and thin state without increasing the number of parts of the capacitor type sensor of the related art.

According to the invention, in the electret capacitor type composite sensor, a film having light transmissibility is further provided, wherein light is incident into the photoelectric conversion portion of the semiconductor element via the filter, the sound hole and the vibration plate.

According to this configuration, the filter can prevent foreign matter from entering. Further, the detection sensitivity of each of the acoustic characteristics and light detection characteristics can be adjusted by adjusting the air permeability and light permeability of the filter. As a result, the capacitor type sensor itself can detect a physical amount of sound, vibration, pressure or acceleration as well as light, and further can maintain the small-sized and thin state without increasing the number of parts of the capacitor type sensor of the related art.

Further, according to the invention, in the electret capacitor type composite sensor, the photoelectric conversion portion of the semiconductor element includes a filter having light shielding property so as to prevent light other than light from the portion formed by the material having light transmissibility of the mounting board.

According to this configuration, the filter can prevent foreign matter from entering. Further, the filter can prevent unnecessary light (that is, light other than light being incident from the mounting board side, to be concrete, light entering from the sound hole side) from reaching the photoelectric conversion portion. Thus, only light from the mounting board (printed board etc.) side can be surely detected. Thus, light incident direction including as to whether or not the light is incident from the mounting board side can also be detected. As a result, the capacitor type sensor itself can detect a physical amount of sound, vibration, pressure or acceleration as well as light, and further can maintain the small-sized and thin state without increasing the number of parts of the capacitor type sensor of the related art.

Further, according to the invention, in the electret capacitor type composite sensor, the semiconductor element is an electret capacitor type composite sensor mounted on the mounting board in a bare chip manner.

According to this configuration, light can be detected efficiently by the photoelectric conversion portion such as a photo-reaction surface of the semiconductor element. Further, since the mold resin is not required, the miniaturization becomes possible. Accordingly, the capacitor type sensor itself can detect a physical amount of sound, vibration, pressure or acceleration as well as light, and further can maintain the small-sized and thin state without increasing the number of parts of the capacitor type sensor of the related art.

Further, according to the invention, in the electret capacitor type composite sensor, the semiconductor element is an electret capacitor type composite sensor formed in a manner that at least a part of the semiconductor element is molded by mold material formed by material having light transmissibility.

According to this configuration, light is detected and the light detection sensitivity can be controlled by suitably adjusting an amount of the mold portion having the light transmissibility or the permeability of the mold material with the light transmissibility. As a result, the capacitor type sensor itself can detect a physical amount of sound, vibration, pressure or acceleration as well as light, and further can maintain the small-sized and thin state without increasing the number of parts of the capacitor type sensor of the related art.

Further, according to the invention, in the electret capacitor type composite sensor, at least a part of a vibration plate constituting the electret capacitor is formed by material having light transmissibility.

According to this configuration, light entering from the hole of the casing or the electrode is passed to the semiconductor element via the vibration plate. Further, when the light permeability of the vibration plate is adjusted by controlling a film thickness of the conductive material etc., the light detection sensitivity can be adjusted. As a result, the capacitor type sensor itself can detect a physical amount of sound, vibration, pressure or acceleration as well as light, and further can maintain the small-sized and thin state without increasing the number of parts of the capacitor type sensor of the related art.

Further, according to the invention, in the electret capacitor type composite sensor, the electret capacitor is constituted of an MEMS chip.

According to this configuration, further miniaturization becomes possible.

Further, according to the invention, in the electret capacitor type composite sensor, the semiconductor element is integrated on a board constituting the MEMS chip.

According to this configuration, further miniaturization becomes possible. Further, it becomes unnecessary to couple between the semiconductor element and the MEMS chip, and the area of the photoelectric conversion portion of the semiconductor element can be made large and so the sensitivity can be improved.

EFFECTS OF THE INVENTION

According to the invention, the parameter of light, which can not be detected by a capacitor type sensor of the related art itself, can be detected not from the value of the electrostatic capacitance but from the current value (or voltage value).

Further, in the case of detecting light, light can be detected accurately and easily without requiring the operation of discriminating from other parameters by obtaining the current value of the semiconductor element which is a characteristic value independent from the electrostatic capacitance value (or voltage) of the capacitor portion.

Furthermore, the capacitor type sensor itself can detect a physical amount of sound, vibration, pressure or acceleration as well as light, and also can maintain the small-sized and thin state without increasing the number of parts of the capacitor type sensor of the related art.

When the sound hole is used as a light introduction hole and the vibration plate (vibration film) is configured of the material having light transmissibility, light can be conducted to the photoelectric conversion portion of the semiconductor element without difficulty via the sound hole and the vibration plate.

Further, when at least a part of the mounting board is configured by the light transmissibility material and light is irradiated from the mounting board side, the permeability of light can be adjusted by the mounting board and the detection sensitivity thereof also can be adjusted. Furthermore, the permeability of light can also be changed according to the layout of the mounting board. and so the detection sensitivity can be adjusted.

Further, when the filter having light transmissibility is provided so as to cover the sound hole or the semiconductor element, it is possible to prevent foreign matter from entering.

Further, the detection sensitivity of each of the acoustic characteristics and light detection characteristics can be adjusted by adjusting the air permeability and light permeability of the filter.

Further, in the case of irradiating light from the mounting board side, when a filter having the light shielding property for preventing unnecessary light is provided, only light from the mounting board side can be detected accurately. Thus, light incident direction including as to whether or not the light is incident from the mounting board side can also be detected. Further, it is possible to prevent foreign matter from entering.

Further, when the semiconductor element is mounted in the bare chip manner, the photoelectric conversion portion (photo-reactive surface) of the semiconductor element can detect light efficiently. Further, since mold resin is not required, the miniaturization becomes possible.

Further, when a transparent mold package is applied to the semiconductor element, the light detection sensitivity can be adjusted. That is, the light detection sensitivity can be optimized by suitably adjusting an amount of the mold portion having the light transmissibility or the permeability of the mold material with the light transmissibility.

When the vibration plate (vibration film) is made transparent, light can be conducted to the semiconductor element without difficulty via the vibration plat. Further, when the light transmissibility of the vibration plate is adjusted by controlling the deposition amount of the conductive material thereof thereby to adjust the film thickness thereof, the light detection sensitivity can also be adjusted.

According to the invention, in addition to sound, vibration, acceleration etc. detected by the displacement amount of the vibration plate within the capacitor type composite sensor, light can be detected by obtaining the current value etc. generated by the photoelectromotive force within the semiconductor element. Thus, it becomes possible to realize a small, thin and light-weighted composite sensor which can detect sound, vibration, pressure or acceleration and light by a single sensor.

Further, when the electret capacitor is constituted of an MEMS chip, further miniaturization becomes possible.

Further, when the semiconductor element is integrated on a board constituting the MEMS chip, further miniaturization becomes possible. Further, it becomes unnecessary to couple between the semiconductor element and the MEMS chip, and the area of the photoelectric conversion portion of the semiconductor element can be made large and so the sensitivity can be improved.

EXPLANATION OF SIGNS

Figure 1:
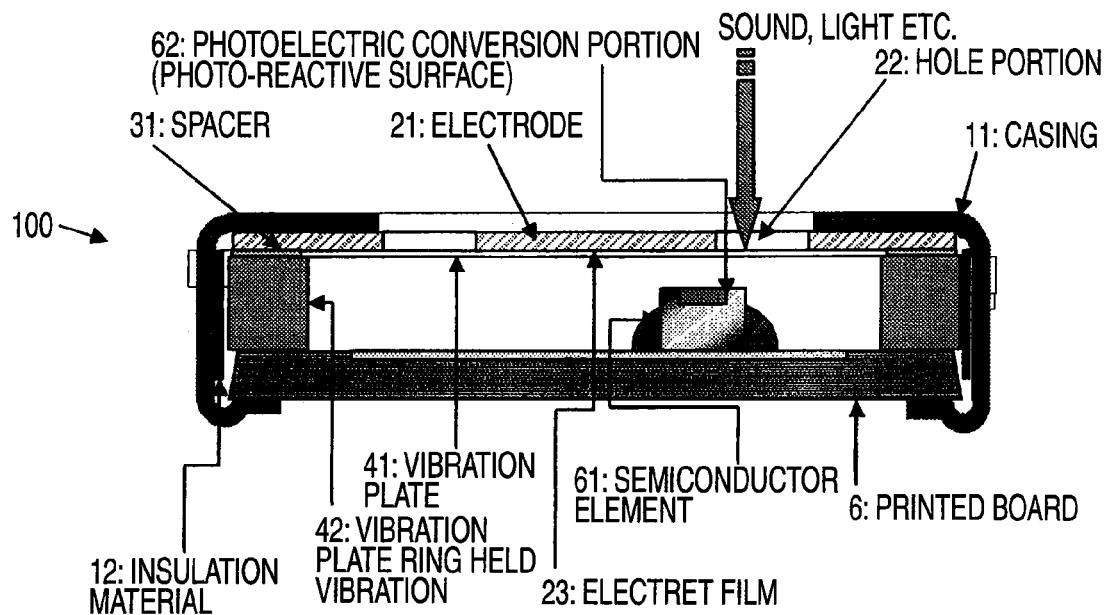
FIG. 1 is a sectional diagram showing an example of the configuration of the electret capacitor type composite sensor according to the first embodiment of the invention (the configuration which conducts light via a sound hole and a vibration plate having light transmissibility).

6 printed board (mounting board)
11 casing
12 insulation material
22 hole portion (sound hole)
23 electret film
41 vibration plate (vibration film)
42 vibration plate ring
31 spacer (gap portion)
61 semiconductor element (FET etc.)
62 photoelectric conversion portion
63 MEMS chip
81 transparent filter
100 electret capacitor type composite sensor
201 terminal of semiconductor element
202 inner lead of a tape carrier
203 terminal of printed board
301 outer lead
302 tab suspending lead
303 bonding wire
400 transparent mold resin (transparent mold sealing member)

BEST MODE FOR CARRYING OUT THE INVENTION

Next, embodiments of the invention will be explained with reference to drawings.

First Embodiment

FIG. 1 is a sectional diagram showing an example of the configuration of the electret capacitor type composite sensor according to the invention (the configuration which conducts light via a sound hole and a vibration plate having light transmissibility).

As shown in the figure, the electret capacitor type composite sensor of FIG. 1 includes a case 11, an electrode 12, a hole portion (a sound hole and a light conducting hole) 22, a spacer (gap portion) 31, a vibration plate (a vibration film) 41, a vibration plate ring (a vibration plate holding portion) 42, a printed board (a mounting plate) 6 and a semiconductor element 61.

A photoelectric conversion portion (a photo reactive surface having a photoelectric conversion function) 62 is provided at a part of the surface of the semiconductor element 61. A part of the hole portion 22 overlaps with the photoelectric conversion portion 62 and the vibration plate (vibration film) 41 has light transmissibility. Thus, light can be conducted to the photo reactive surface 62 without difficulty via the hole portion (sound hole) 22 and the vibration plate 41.

When the vibration plate (vibration film) 41 is made transparent, light can be conducted to the semiconductor element. Further, when the light transmissibility of the vibration plate 41 is adjusted by controlling the film thickness (deposition amount) of conductive material thereof, for example, the light detection sensitivity can also be adjusted.

The case 11 is coupled to the printed board 6. The vibration plate (vibration film) 41 and an electret film 23 on the electrode 21, between which a spacer (a gap forming portion) 31 is placed, constitute a capacitor. In this case, areas of the gap and the vibration plate are arranged so that the electrostatic capacitance of the capacitor portion is set to about in a range from 5 pF to 20 pF. The signal receiving voltage at the electret portion is set to about −300 volt. These values are mere examples and so the embodiment is not limited to thereto, The case 11 functions as a frame of the sensor and as a shielding for the negative electrode of the capacitor. The vibration plate (vibration film) 41 is pasted to the vibration plate ring 42 by means of adhesive so as to maintain a constant tension.

The vibration plate (vibration film) 41 is electrically conductive with the vibration plate ring 42 via a conductive layer such as Ni or Al (a deposition film etc. obtained by metal deposition).

The case 11 and the vibration plate ring 42 are insulated to each other via an insulation material 12. A printed board 51 is made conductive with the vibration plate ring.

An FET (a field effect transistor, for example, JFET) is used as the semiconductor element 61. The photoelectric conversion portion 62 is exposed on the surface of the FET. A patter is laid out in a manner that the gate of the FET and the vibration plate ring 42 are made electrically conductive to each other.

Further, the source (negative polarity) of the FET and the case 11 are electrically coupled.

A bare chip mounting is employed as a structure for mounting the semiconductor element 61 on the printed board (mounting board) 6. In FIG. 1, the semiconductor element 61 is mounted (flip chip mounting) on the printed board (mounting board) 6 by using bump electrodes (not shown) and fixed thereto by adhesive P. The mounting method of the semiconductor element is not limited thereto and mounting methods shown in FIG. 9 or FIG. 10 may be employed in place thereof.

Figure 9:
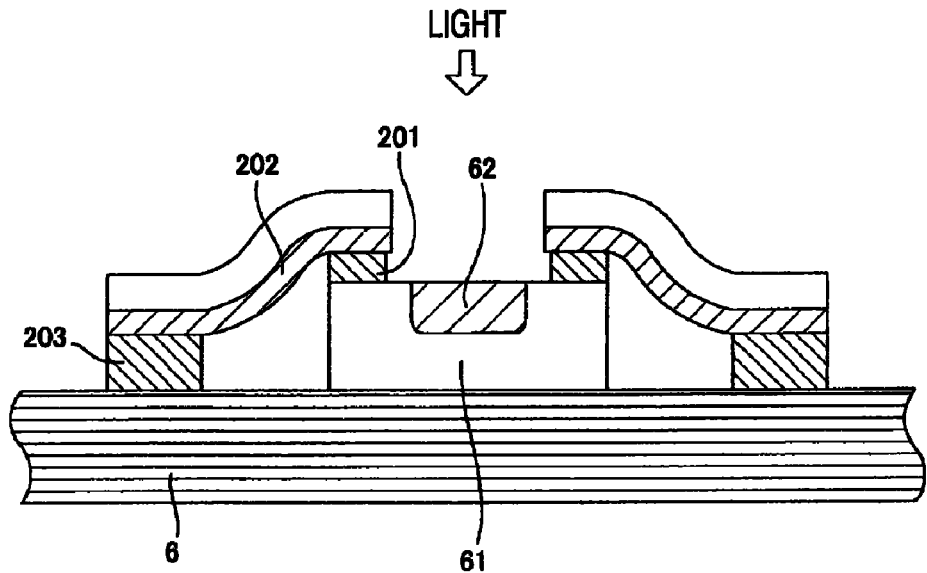
FIG. 9 is a sectional diagram showing a main portion of an example (an example employing a TAB system) of the mounting method of a semiconductor element.

FIG. 9 is a sectional diagram showing a main portion of an example (TAB) of the mounting method of a semiconductor element. In FIG. 9, portions common to those of FIG. 1 are referred to by the identical reference numerals. As shown in this figure, a metal terminal 201 is provided on the surface of the semiconductor element 61. The metal terminal 201 is electrically coupled to an output terminal 203 on the printed board 6 via the inner lead 202 of a tape carrier.

When the semiconductor element is mounted in the bare chip manner, the photoelectric conversion portion of the semiconductor element can be exposed to a large extent, and so light can be detected effectively. Further, since mold resin is not required, the miniaturization becomes possible.

Figure 10:
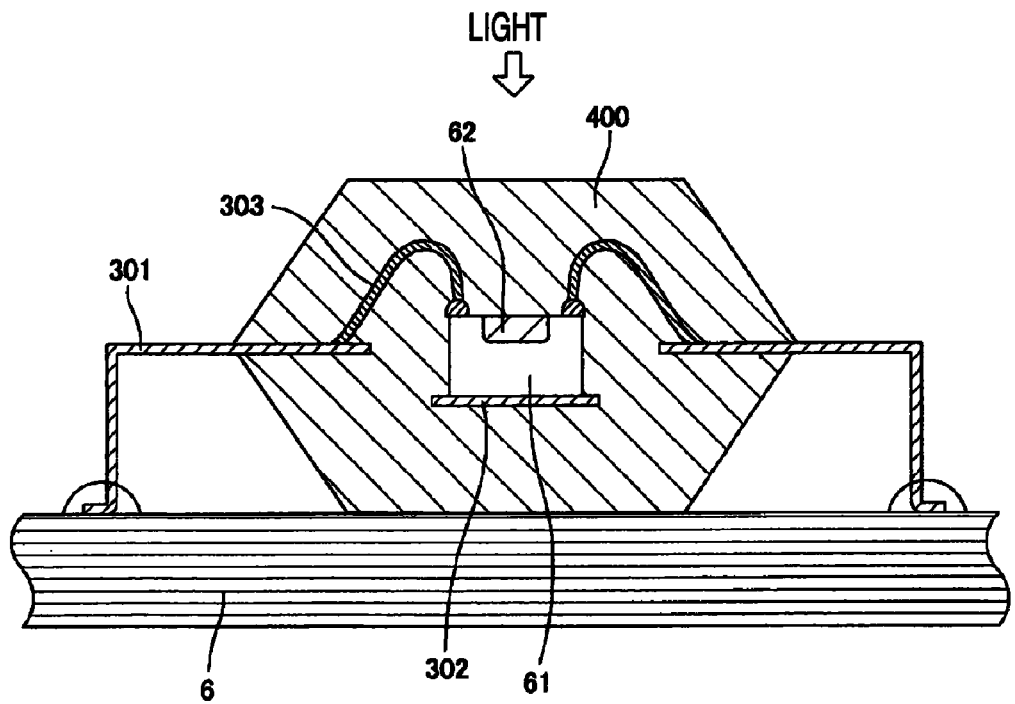
FIG. 10 is a sectional diagram showing a main portion of another example (an example employing a transparent mold package) of the mounting method of a semiconductor element.

FIG. 10 is a sectional diagram showing a main portion of another example (an example employing a transparent mold package) of the mounting method of a semiconductor element. In FIG. 10, portions common to those of FIG. 1 are referred to by the identical reference numerals.

As shown in this figure, the semiconductor element 61 is placed on a tab suspending lead 302. The semiconductor element 61 is electrically coupled to an outer lead 301 via a bonding wire 303. The semiconductor element 61 is sealed by transparent mold resin (for example, resin mainly formed by bisphenol A epoxy resin and acid anhydride) 400.

Since the transparent mold package is applied, the light detection sensitivity can be adjusted. That is, the light detection sensitivity can be optimized by suitably adjusting an amount of the mold portion having the light transmissibility or the permeability of the mold material with the light transmissibility.

As to the electret capacitor type composite sensor thus configured, the operation thereof will be explained concretely with reference to FIGS. 4 to 8.

Figure 4:
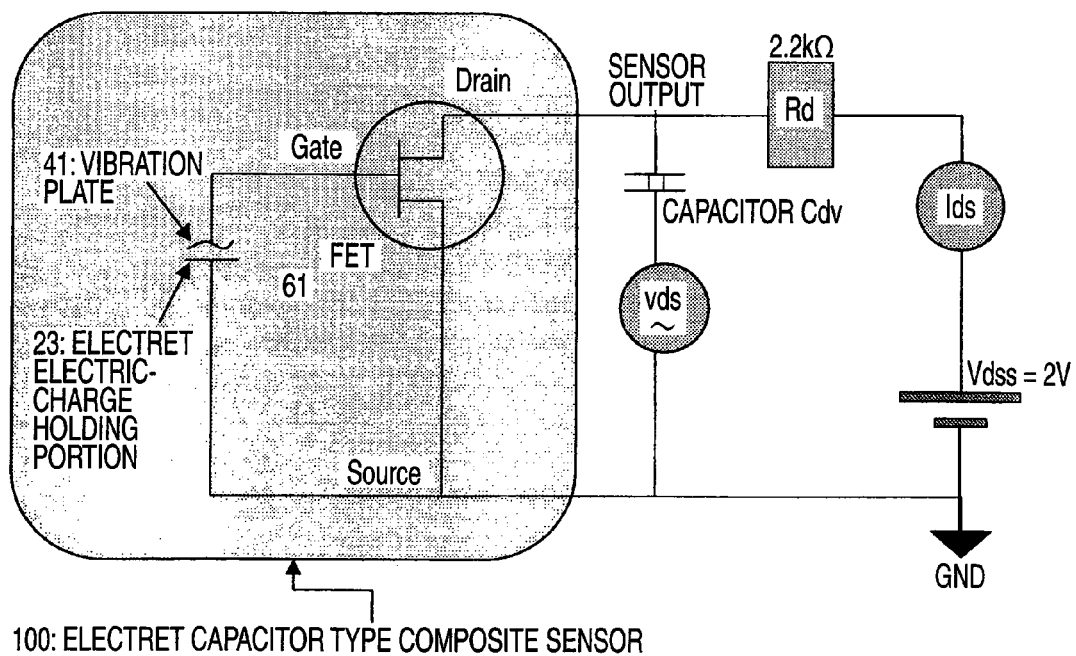
FIG. 4 is a circuit diagram showing the configuration of the multivariate detection circuit using the electret capacitor type composite sensor according to the invention.

FIG. 4 is a circuit diagram showing the configuration of the multivariate detection circuit using the electret capacitor type composite sensor according to the invention.

As shown in this figure, the multivariate detection circuit (hereinafter may be merely referred as a detection circuit) includes an electret capacitor type composite sensor 100, a voltage supply Vdss, a load resistance Rd, an ampere meter Ids, a volt meter Vds and a capacitor Cdv for cutting a DC component.

The gate portion of the FET (semiconductor element 61) receives the voltage change of the capacitor portion due to an electrostatic capacitance change which is caused by the vibration of the vibration plate (vibration film) 41 within the electret capacitor type composite sensor 100 due to the input such as external sound or vibration.

A current flowing within the detection circuit of FIG. 4 changes due to the change of the voltage inputted to the FET (semiconductor element 61), whereby an amount of voltage drop at the load resistor Rd changes. As a result, when the volt meter Vds reads the voltage outputted to the detection circuit of FIG. 4, values of sound, vibration, pressure or acceleration etc. can be detected.

Figure 5:
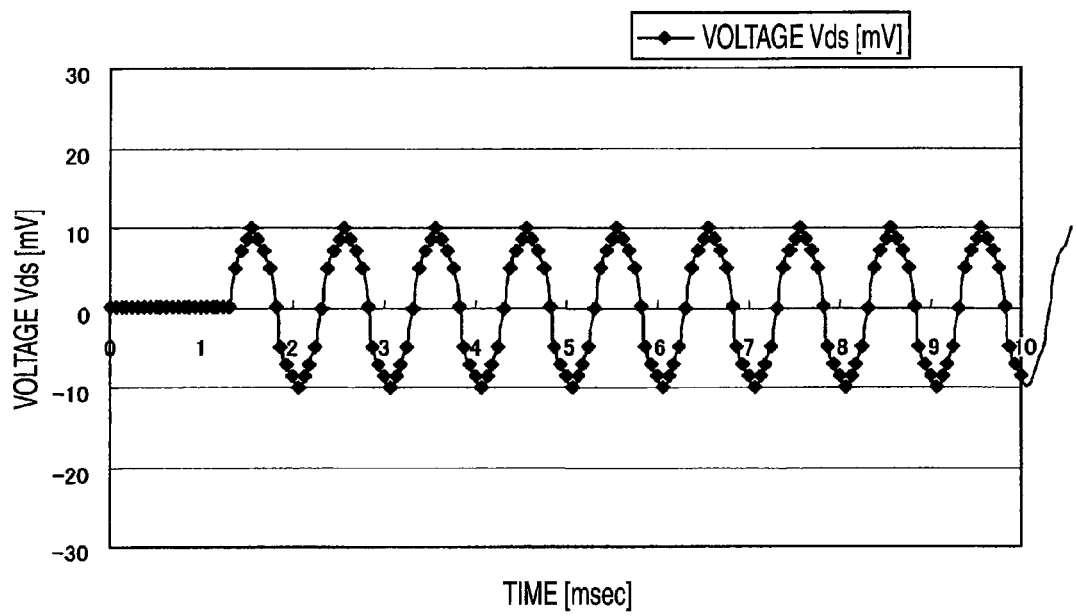
FIG. 5 is a diagram showing an example of sound detection characteristics in the multivariate detection circuit of FIG. 4.

FIG. 5 is a diagram showing an example of sound detection characteristics in the multivariate detection circuit of FIG. 4. FIG. 5 shows voltage data in the case of inputting sound of 1 kHz. The frequency and changing amount of the voltage change in accordance with inputted sound pressure.

Figure 7:
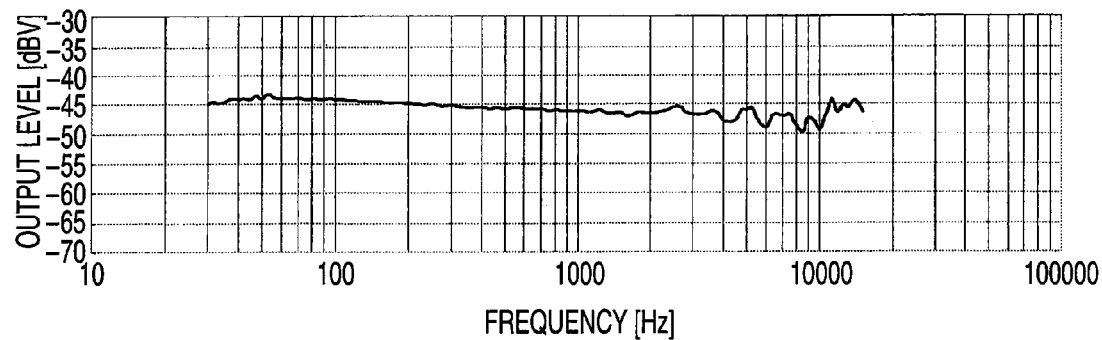
FIG. 7 is a diagram showing the relation between the sound input frequency and the output voltage of the multivariate detection circuit of FIG. 4.

FIG. 7 is a diagram showing the relation between the sound input frequency and the output voltage of the multivariate detection circuit of FIG. 4. It will be clear from the figure that a flat voltage characteristics is obtained over a quite wide frequency band.

In the detection circuit of FIG. 4, light entered from the outside is irradiated on the portion 62 of the surface of the FET (semiconductor element 61), whereby photoelectromotive force is generated within the FET and so a value of a current flowing into the FET changes. The light can be detected by reading the current value of the ampere meter Ids. Alternatively, the circuit may be configured in a manner that a DC voltage can be read in parallel to the volt meter Vds so that light can also be detected by reading the voltage.

Figure 6:
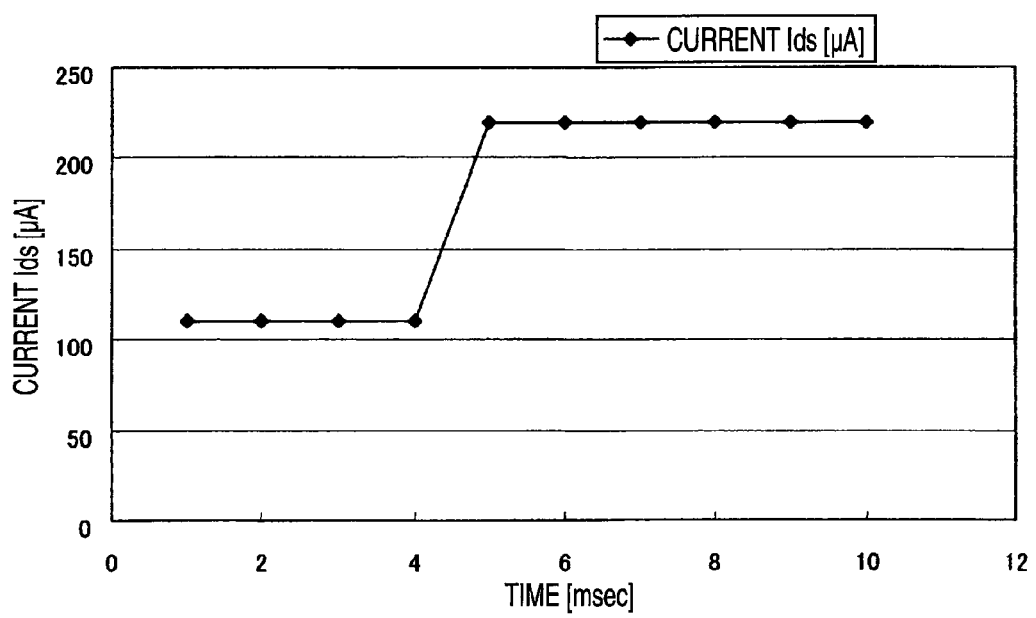
FIG. 6 is a diagram showing an example of light detection characteristics in the multivariate detection circuit of FIG. 4.

FIG. 6 is a diagram showing the light detection characteristics in the multivariate detection circuit of FIG. 4.

FIG. 6 shows the current data in the case where a light input amount changes stepwise. It can be read from FIG. 6 that, for example, the current of 110 μA is inputted until 4 second on the time axis and the current of 225 μA is inputted from 5 second on the time axis. According to the illumination-current curve shown in FIG. 8, it will be understood that the current values 110 μA and 225 μA correspond to 50 lx and 5,000 lx, respectively. Thus, it can be read that light of about 50 lx was inputted until 4 second on the time axis and light of about 5,000 lx inputted from 5 second on the time axis. The relation between the light quantity and the current value is determined by the configuration (photoelectric conversion efficiency) of the detection circuit or the capacitor type composite sensor.

Figure 8:
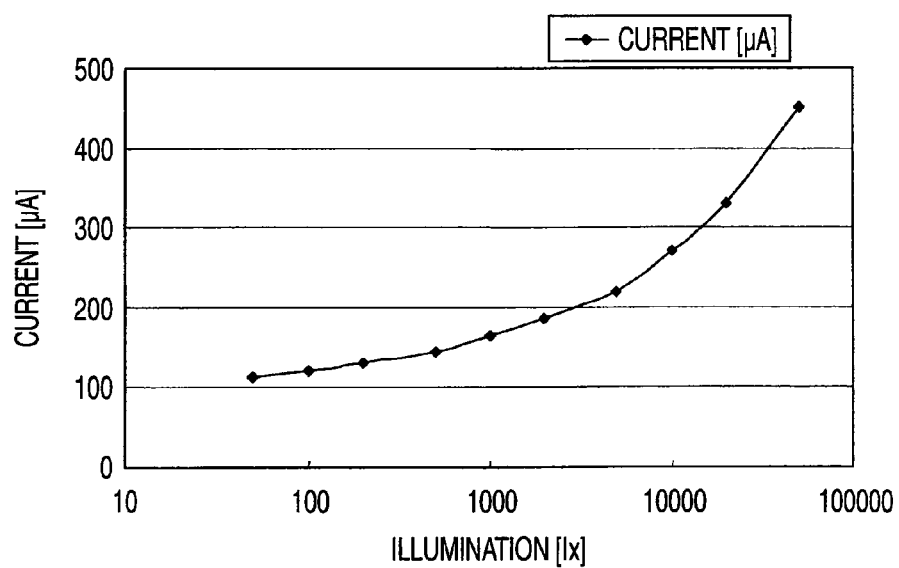
FIG. 8 is a characteristic diagram showing the relation between the light input amounts and the current values in the multivariate detection circuit of FIG. 4.

FIG. 8 is a characteristic diagram showing the relation between the light input amounts and the current values in the multivariate detection circuit of FIG. 4. It will be understood from this figure that the current value increases in accordance with the in crease of the illumination. In this case, it is important that since the setting value of the electrostatic capacitance of the capacitor portion is set in a rage of 5 to 20 pF, the voltage of the photoelectromotive force is set to a sufficiently large value with respect to the voltage change at the capacitor portion, whereby the electric signal generated by the change of the electrostatic capacitance and the electric signal generated by the light irradiation can be easily detected as independent parameters respectively eve if these signals are not subjected to a particular discriminating processing.

According to the invention, in addition to sound, vibration, acceleration etc. detected by the displacement amount of the vibration plate within the capacitor type composite sensor, light can be detected by obtaining the current value etc. generated by the photoelectromotive force within the semiconductor element. Thus, it becomes possible to realize a small, thin and light-weighted composite sensor which can detect sound, vibration, pressure or acceleration and light by a single sensor. Thus, the invention is particularly effective in a system in which the capacitor type composite sensor is used as a sensor used for a security products, for example, a sensor for detecting sound and light in a home security system, and a camera and an alarm device are operated in accordance with the output of the composite sensor. For example, when the sensor is used by suitably selecting the configuration such that the signal is outputted only when both sound and light is detected, the effects such as the reduction of erroneous operation can be attained. Further, since the invention can be applied to a button or a sensor for a game machine, it is possible to realize the miniaturization and the cost reduction.

In the case of measuring the pressure or the acceleration by using the capacitor type sensor, since the value can be measured from the change of the capacitance between the both ends of the vibration plate 41 and the electret film 23 as an electret electric-charge holding portion. That is, as clear from the equivalent circuit shown in FIG. 4, as to the detection of the pressure or the acceleration, a physical amount of the pressure or the acceleration is detected from the change of the capacitance value of the capacitor due to the displacement of the vibration plate. Thus, this value can be measured by detecting the capacitance between the gate and the source of the FET (semiconductor element 61) or the voltage between the source and the drain of the FET (semiconductor element 61).

Second Embodiment

Figure 2:
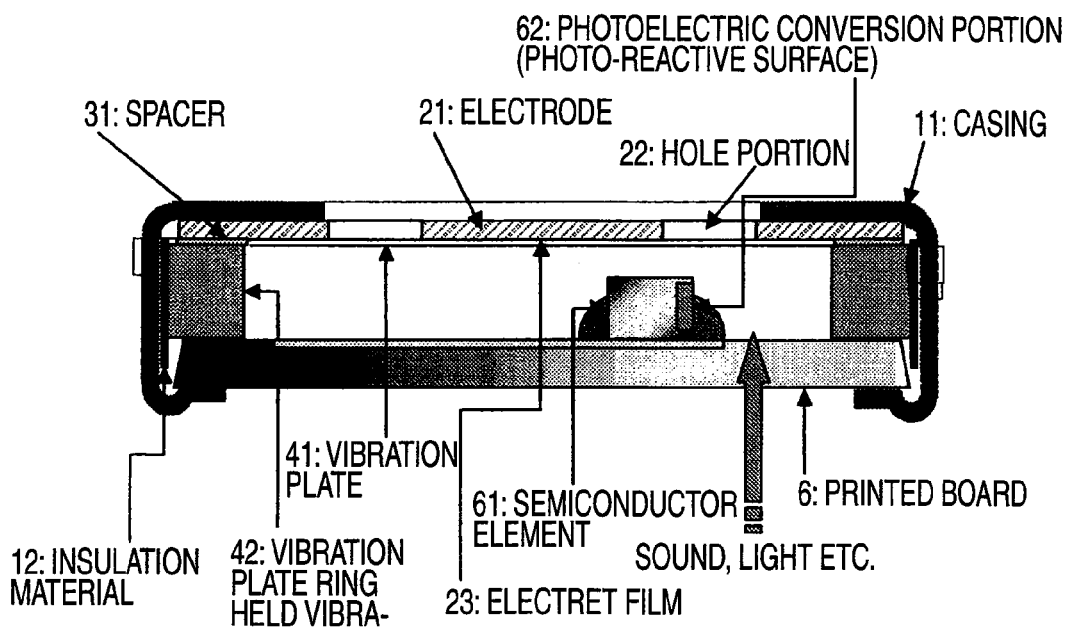
FIG. 2 is a sectional diagram showing another example of the configuration of the electret capacitor type composite sensor according to the second embodiment of the invention (the configuration which conducts light from the printed board side).

FIG. 2 is a sectional diagram showing another example of the configuration of the electret capacitor type composite sensor according to the invention (the configuration which conducts light from the printed board side). In FIG. 2, portions common to those of FIG. 1 are referred to by the identical reference numerals.

The configuration of FIG. 2 differs from FIG. 1 in points that at least a part of the printed board 6 has light transmissibility and the photoelectric conversion portion 62 of the semiconductor element 61 is provided on the surface of the semiconductor element 61. Thus, light from the printed board 6 side can be conducted to the photoelectric conversion portion 62 of the semiconductor element 61 without difficulty.

According to this configuration, by selecting and preparing the material of the printed board 6, the permeability thereof can be adjusted so that light from the board side can pass through the board and is detected, and the detection sensitivity of the light can be adjusted. The permeability of light can also be changed according to the layout of the printed board. As a result, the capacitor type sensor itself can detect a physical amount of sound, vibration, pressure or acceleration as well as light, and further can maintain the small-sized and thin state without increasing the number of parts of the capacitor type sensor of the related art.

Third Embodiment

Figure 3:
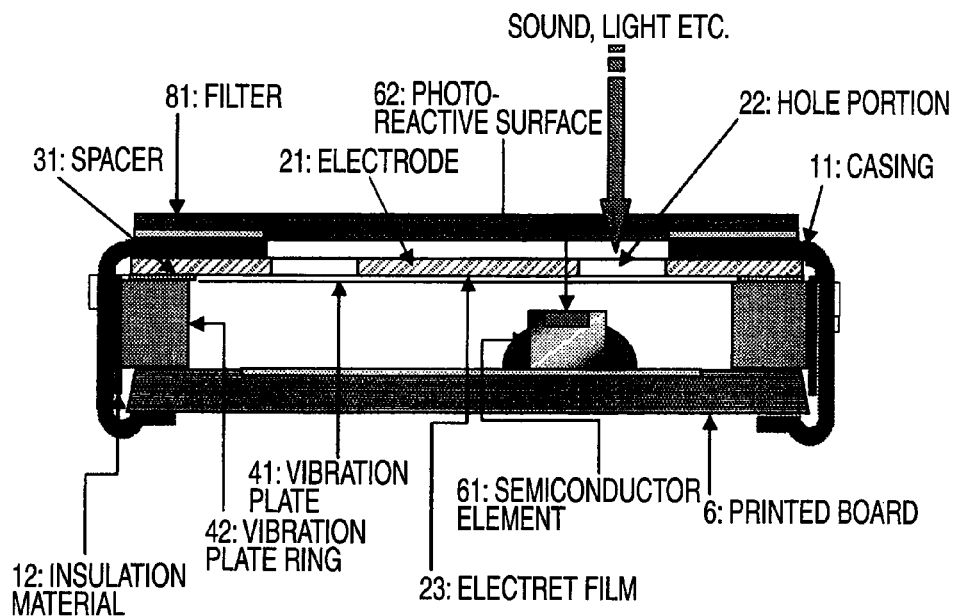
FIG. 3 is a sectional diagram showing another example of the configuration of the electret capacitor type composite sensor according to the third embodiment of the invention (the configuration which a filter covering the hole portion is provided).

FIG. 3 is a sectional diagram showing another example of the configuration of the electret capacitor type composite sensor according to the invention (the configuration which a filter covering the hole portion 22 is provided). In FIG. 3, portions common to those of FIG. 1 are referred to by the identical reference numerals.

The configuration of FIG. 2 differs from FIG. 1 in a point that a filter 81 is provided so as to cover the hole portion 22 (the remaining points are same as FIG. 1). Since the filter 81 is provided, it is possible to prevent foreign matter from entering. Further, the detection sensitivity of each of the acoustic characteristics and light detection characteristics can be adjusted by adjusting the air permeability and light permeability of the filter 81.

As a result, the capacitor type sensor itself can detect a physical amount of sound, vibration, pressure or acceleration as well as light with high accuracy, and further can maintain the small-sized and thin state without increasing the number of parts of the capacitor type sensor of the related art.

In the sensor of FIG. 2 (the sensor having the configuration which conducts light from the printed board side), it is possible to provide a filter having the light shielding property can be provided at the position covering the hole portion 22, like FIG. 3. In this case, the filter serves to prevent foreign matter from entering and also to shield light entering from the hole portion 22. Thus, only light from the printed board 6 side can be detected accurately. As a result, the capacitor type sensor itself can detect a physical amount of sound, vibration, pressure or acceleration as well as light with high accuracy, and further can maintain the small-sized and thin state without increasing the number of parts of the capacitor type sensor of the related art.

Although the aforesaid explanation is made as to the example where the composite sensor is constituted by an electret capacitor microphone using an FET a capacitor type sensor, a capacitor type microphone, an MEMS sensor or an MEMS microphone using another semiconductor element may also be employed in the similar manner.

As explained above, according to the invention, the parameter of light, which can not be detected by a capacitor type sensor of the related art itself, can be detected not from the value of the electrostatic capacitance but from the current value (or voltage value).

In the case of detecting light, light can be detected accurately and easily without-requiring the operation of discriminating from other parameters by obtaining the current value of the semiconductor element which is a characteristic value independent from the electrostatic capacitance value (or voltage) of the capacitor portion.

Further, the capacitor type sensor itself can detect a physical amount of sound, vibration, pressure or acceleration as well as light, and also can maintain the small-sized and thin state without increasing the number of parts of the capacitor type sensor of the related art.

When the sound hole is used as a light introduction hole and the vibration plate (vibration film) is configured of the material having light transmissibility, light can be conducted to the photoelectric conversion portion of the semiconductor element without difficulty via the sound hole and the vibration plate.

Further, when at least a part of the mounting board is configured by the light transmissibility material and light is irradiated from the mounting board side, the permeability of light can be adjusted by the mounting board and the detection sensitivity thereof also can be adjusted. Furthermore, the permeability of light can also be changed according to the layout of the mounting board. and so the detection sensitivity can be adjusted.

Further, when the filter having light transmissibility is provided so as to cover the sound hole or the semiconductor element, it is possible to prevent foreign matter from entering.

Further, the detection sensitivity of each of the acoustic characteristics and light detection characteristics can be adjusted by adjusting the air permeability and light permeability of the filter.

Further, in the case of irradiating light from the mounting board side, when a filter having the light shielding property for preventing unnecessary light is provided, only light from the mounting board side can be detected accurately. Further, the light entering direction can also be detected and it also becomes possible to prevent foreign matter from entering. Alternatively, a casing having the light shielding property may be used to cover and light may be introduced to the optical sensor via a light conductive member such as an optical fiber. Thus, the probability of the erroneous operation of the sensor can be reduced. Further, it is possible to apply a sound transmission portion configured by a vibration member such as a soft film may be used in place of the sound hole.

When the semiconductor element is mounted in the bare chip manner, since the photoelectric conversion portion of the semiconductor element can be exposed to a large extent, light can be detected efficiently. Further, since the mold resin is not required, the miniaturization becomes possible.

Further, when a transparent mold package is applied to the semiconductor element, the light detection sensitivity can be adjusted. That is, the light detection sensitivity can be optimized by suitably adjusting an amount of the mold portion having the light transmissibility or the permeability of the mold material with the light transmissibility.

When the vibration plate (vibration film) is made transparent, light can be conducted to the semiconductor element without difficulty via the vibration plat. Further, when the light transmissibility of the vibration plate is adjusted by controlling the deposition amount of the conductive material thereof thereby to adjust the film thickness thereof, the light detection sensitivity can also be adjusted.

According to the invention, in addition to sound, vibration, acceleration etc. detected by the displacement amount of the vibration plate within the capacitor type composite sensor, light can be detected by obtaining the current value etc. generated by the photoelectromotive force within the semiconductor element. Thus, it becomes possible to realize a small, thin and light-weighted composite sensor which can detect sound, vibration, pressure or acceleration and light by a single sensor.

Fourth Embodiment

Figure 11:
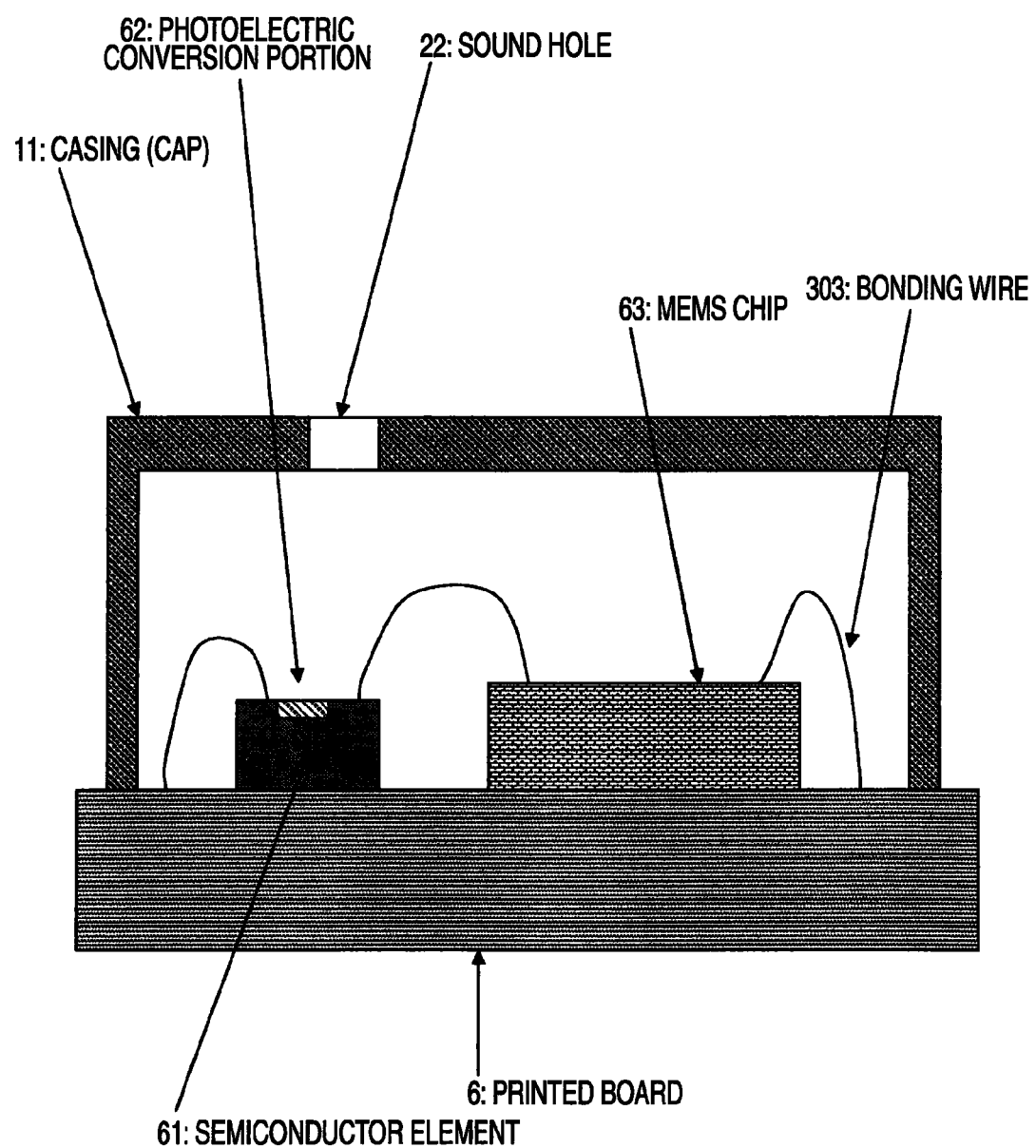
FIG. 11 is a sectional diagram showing another example of the configuration (the configuration using an MEMS chip) of the electret capacitor type composite sensor according to the fourth embodiment of the invention.

FIG. 11 is a sectional diagram showing the configuration of the electret capacitor type composite sensor according to the invention in which an MEMS chip is used as an acoustic sensor. In FIG. 11, portions common to those of FIG. 1 are referred to by the identical reference numerals.

As shown in FIG. 11, the electret capacitor type composite sensor according to this embodiment is characterized in that the acoustic sensor having a function of the vibration plate and the electret film is configured by the MEMS chip 63 formed and configured on a silicon board (chip). This chip is mounted on the printed board 6, on which a wiring pattern is formed, together with the semiconductor element 61 having the photoelectric conversion portion 62. The outer sides of this chip and the element is covered by the casing 11 in which the hole portion (sound hole) 22 is formed. The MEMS chip 63 and the semiconductor chip 61 are electrically coupled by a bonding wire 303 to each other.

For the purpose of noise suppression, desirably, the casing 11 is coupled electrically to the negative electrodes of the semiconductor element 61 and the MEMS chip 63 via the printed board 6. The hole portion (sound hole) 22 may be disposed at the casing 11 or the printed board 6 in a range where a signal of sound or light can be detected.

According to this configuration, further miniaturization becomes possible.

Further, when a PN junction is formed on the surface of the silicon chip constituting the MEMS chip and the photoelectric conversion portion is formed therein, since the composite sensor can be formed as a single chip, further miniaturization becomes possible. Further, since it becomes unnecessary to couple between the semiconductor element and the MEMS chip, the area of the photoelectric conversion portion of the semiconductor element can be made large and so the sensitivity can be improved.

INDUSTRIAL APPLICABILITY

The invention can attain the effect of realizing the small, thin and light-weighted composite sensor that can detect sound, vibration, pressure or acceleration and light by itself. Thus, the invention is useful for a security system and a game machine etc. as the electret capacitor type composite sensor.

The invention claimed is:

1. An electret capacitor type composite sensor which contains an electret capacitor and a semiconductor element having a function of amplifying and outputting a signal obtained from the electret capacitor, can detect a predetermined physical amount according to a change of an electrostatic capacitance of the electret capacitor and has a light detection function, wherein the semiconductor element has a photoelectric conversion portion, an electric signal is generated by photoelectric conversion when light is conducted to the photoelectric conversion portion, and the electric signal is outputted from the semiconductor element discriminatively from an electric signal generated due to a change of the electrostatic capacitance of the electret capacitor.

2. The electret capacitor type composite sensor according to claim 1, wherein at least a part of a sound hole for conducting sound to a vibration plate constituting the electret capacitor overlaps with the photoelectric conversion portion of the semiconductor element.

3. The electret capacitor type composite sensor according to claim 1, wherein the vibration plate is formed by material having light transmissibility, and light is conducted to the photoelectric conversion portion of the semiconductor element via the sound hole and the vibration plate.

4. The electret capacitor type composite sensor according to claim 1, wherein the semiconductor element is mounted on a mounting board, at least a part of the mounting board is formed by material having light transmissibility, and the photoelectric conversion portion of the semiconductor element is disposed so as to receive light being incident from a portion formed by the material having light transmissibility of the mounting board.

5. The electret capacitor type composite sensor according to claim 3, further comprising a film having light transmissibility, wherein light is incident into the photoelectric conversion portion of the semiconductor element via the filter, the sound hole and the vibration plate.

6. The electret capacitor type composite sensor according to claim 1, wherein the photoelectric conversion portion of the semiconductor element includes a filter having light shielding property so as to prevent light other than light from the portion formed by the material having light transmissibility of the mounting board.

7. The electret capacitor type composite sensor according to claim 1, wherein the semiconductor element is an electret capacitor type composite sensor mounted on the mounting board in a bare chip manner.

8. The electret capacitor type composite sensor according to claim 1, wherein the semiconductor element is an electret capacitor type composite sensor formed in a manner that at least a part of the semiconductor element is molded by mold material formed by material having light transmissibility.

9. The electret capacitor type composite sensor according to claim 1, wherein at least a part of a vibration plate constituting the electret capacitor is formed by material having light transmissibility.

10. The electret capacitor type composite sensor according to claim 1, wherein the electret capacitor is constituted of an MEMS chip.

11. The electret capacitor type composite sensor according to claim 10, wherein the semiconductor element is integrated on a board constituting the MEMS chip.

* * * * *